Figure 1A:
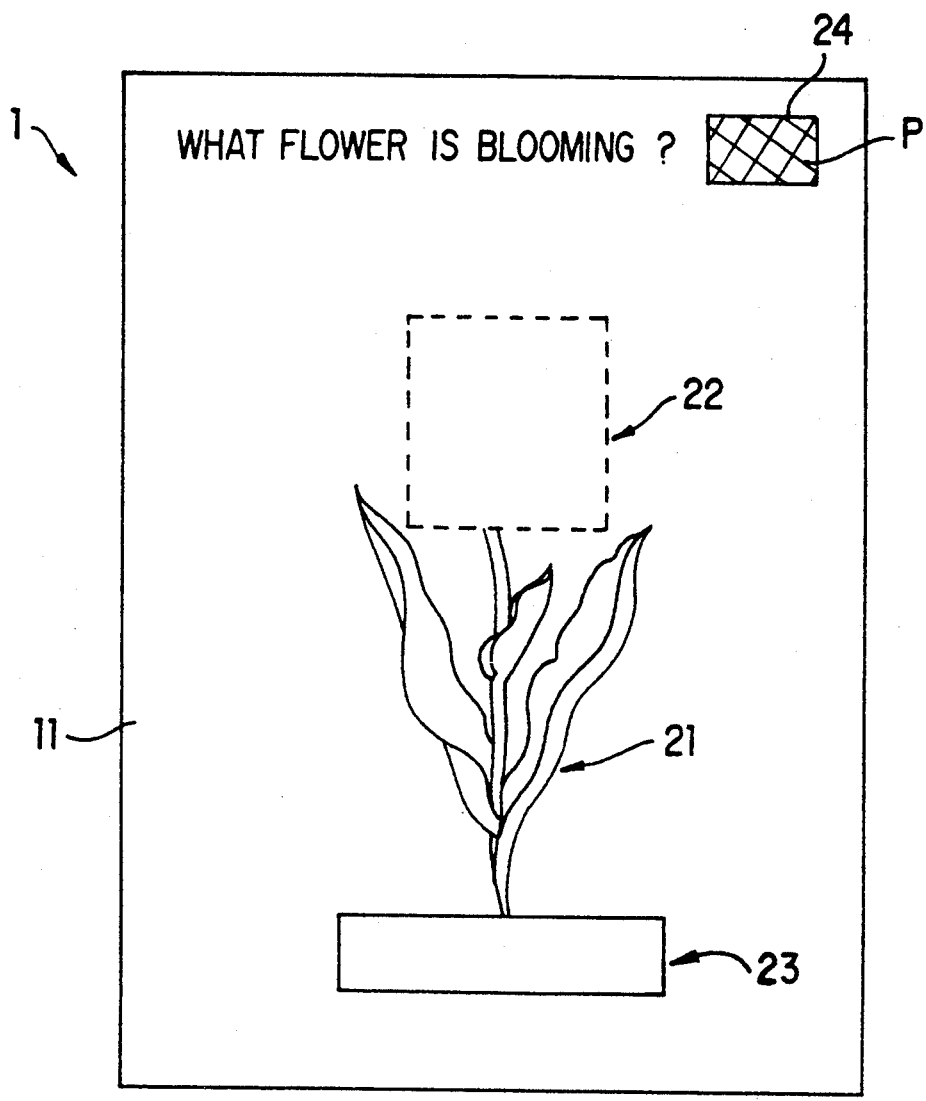

United States Patent [19]

Kawashima

[11] Patent Number: 5,215,956

[45] Date of Patent: Jun. 1, 1993

[54] COLOR CHANGING PRINT

[76] Inventor: Kiyoharu Kawashima, 5-7 Esaka-cho 5-chome, Suita-shi, Osaka-fu, Japan

[21] Appl. No.: 754,155

[22] Filed: Sep. 3, 1991

Related U.S. Application Data

[62] Division of Ser. No. 533,774, Jun. 6, 1990, abandoned.

[51] Int. Cl.$^5$ .......................... B41M 5/04; B44F 1/10; G09B 11/10
[52] U.S. Cl. ................... 503/201; 106/21 R; 428/29; 503/206; 503/213; 503/216; 503/217; 503/218; 503/219; 434/84; 434/98; 446/147
[58] Field of Search ................. 106/21; 503/213, 216, 503/217, 218, 219, 201; 434/84, 98; 446/147; 428/29

[56] References Cited

U.S. PATENT DOCUMENTS

| | | | |
|---|---|---|---|
| 3,617,325 | 11/1971 | Spokes et al. | 427/337 |
| 3,823,022 | 7/1974 | Thomas | 503/219 |
| 4,084,332 | 4/1978 | Waloszyk et al. | 503/206 |
| 4,162,164 | 7/1979 | Lin | 106/21 |
| 4,188,431 | 2/1980 | Sokol et al. | 106/21 |
| 4,322,466 | 3/1982 | Tomlinson | 106/21 |
| 4,525,214 | 6/1985 | Panken | 106/21 |
| 4,714,275 | 12/1987 | Engel | 281/15 R |
| 5,018,974 | 5/1991 | Carnahan | 434/98 |

Primary Examiner—Dennis Albrecht
Attorney, Agent, or Firm—Stevens, Davis, Miller & Mosher

[57] ABSTRACT

In the color changing print of this invention, plural areas are printed by using plural types of color changing inks which develop into different colors from the substantially invisible colorless state by reaction with a color changing agent. By the emergence of print from colorlessness and by giving changes in the appearing colors, unexpectedness and entertainingness are provided so that an attractive education may be realized.

8 Claims, 7 Drawing Sheets

COLOR CHANGING PRINT

This application is a division of application Ser. No. 533,774, filed Jun. 6, 1990 now abandoned.

The present invention relates to a color changing print which enables attractive education and entertainment by including colors printed by using plural inks containing color changing agents which change from colorlessness to different colors by action of color formers.

Conventional prints are printed on printing paper with visible inks, and it is rarely intended to generate colors after they are printed. Still less it is suggested to generate different colors by users' own hands on invisible prints, allowing pictures, graphics and letters to come out which are displayed in plural colors.

On the other hand, a lot of colorful books are published in the market, and even a small child can now acquire sense of color and shape through these books. For example, most knowledge on specific shapes of flowers and animals and knowledges related to colors are acquired through such books which are printed in their original colors.

However, since the acquisition of knowledge from books through the eyes requires neither imagination nor judgement at readers' side, it lacks stimulus and appeal, thus, being less effective.

Therefore, for education related to specific shapes and colors that flowers and animals have, it is effective to consider by oneself to acquire knowledge by comparing the correct with the wrong, but such prints do not exist in the market, and the introduction has been demanded. In order to solve a part of the problems, there are proposed an invisible print that changes to be visible in colors by heating it, and printed letters camouflaged by using color dots that become visible through a specific color filter, but the former requires a heat generator and it is not only dangerous to young people but also difficult to generate different colors simultaneously. The latter is in need of a filter when reading, difficult to display complex fine pictures, inconvenient to use and needs plenty of time for printing it. Thus, neither of them can solve the problems.

It is hence a primary object of the invention to present a color changing print which can solve the problems and allows acquisition of knowledge on shapes and colors of things, developing thought and judgement, and which basically comprises plural color changing areas printed with inks containing color changing agents which change from invisible colorlessness to visible different colors by applying color formers.

According to one aspect of the present invention, a color changing print comprises plural color changing areas printed with inks each of which contains a color changing agent which changes from substantially invisible colorlessness to a visible corresponding color by a color former applied with an applicator.

As the change of color is caused by applying a color former, it needs no heater and is operated safely. Comprising plural color changing areas, it enables the reader to generate a variety of colors and their mixes, resulting in colorful expressions, which allows delicate education on shapes and colors. Moreover, since colors are generated by readers themselves, each color is generated in different time, which develops readers' imagination and judgement and gives them strong impressions with the displayed shapes and colors, resulting in an effective and memorable color education.

Figure 2A:
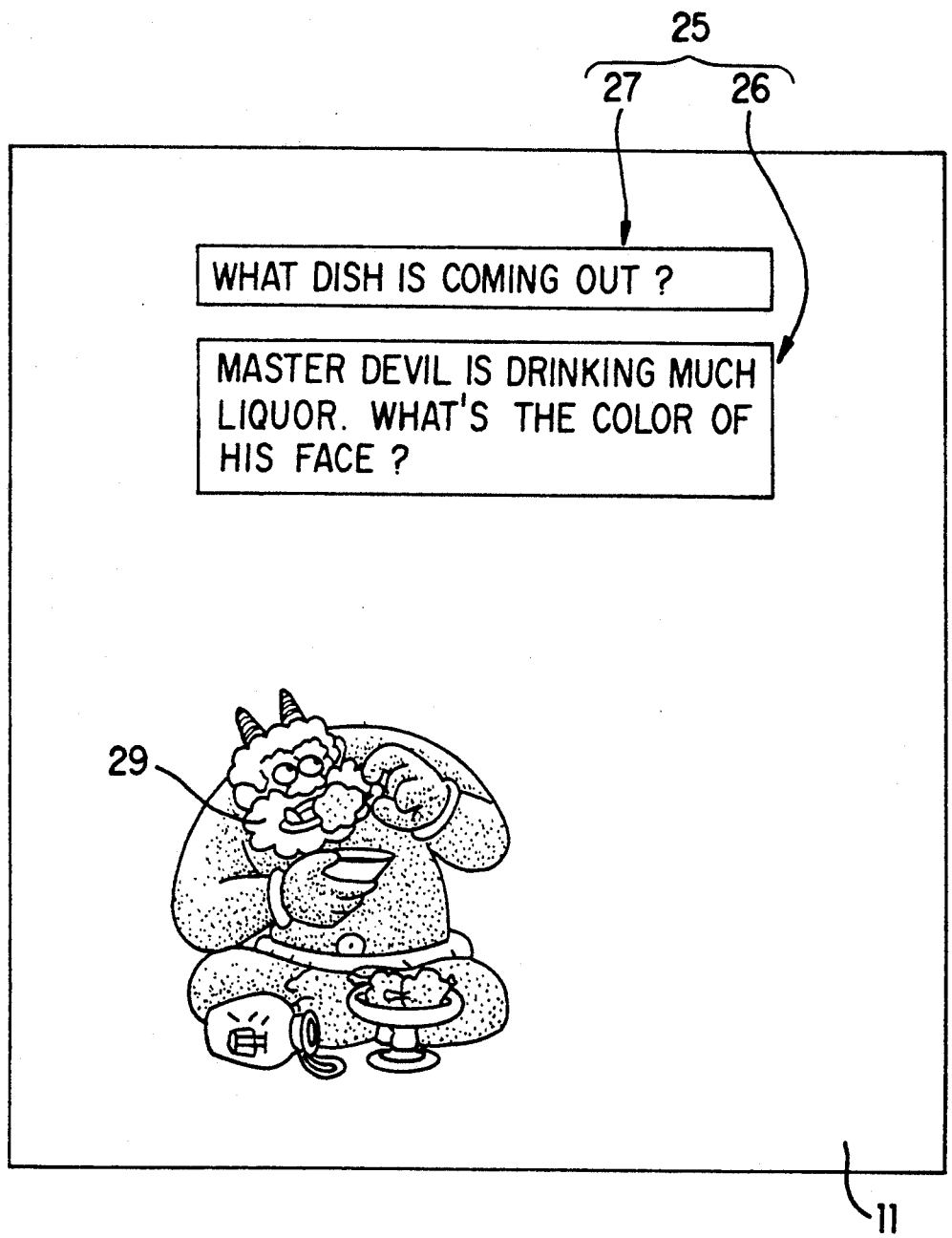
Figure 2B:
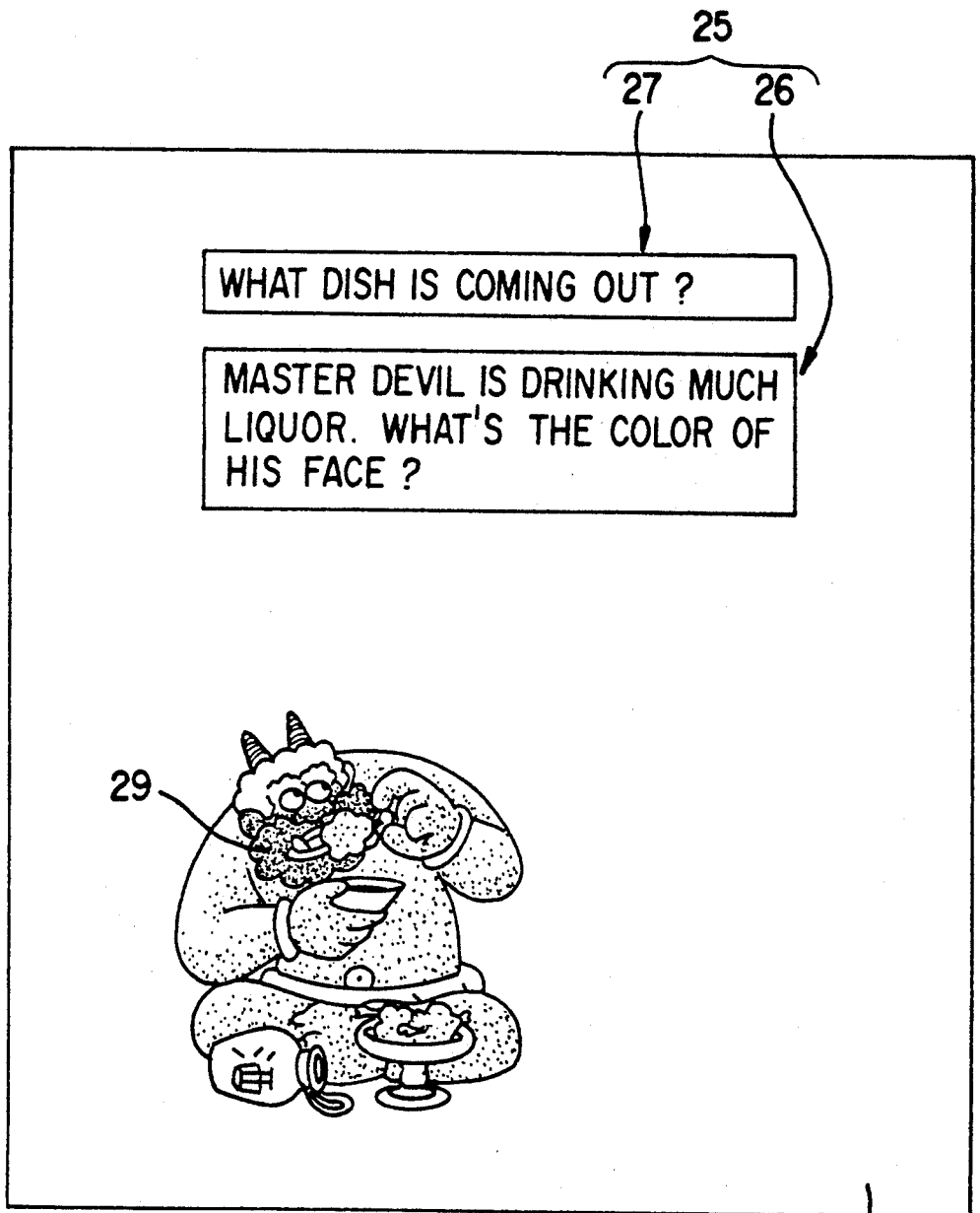
Figure 2C:
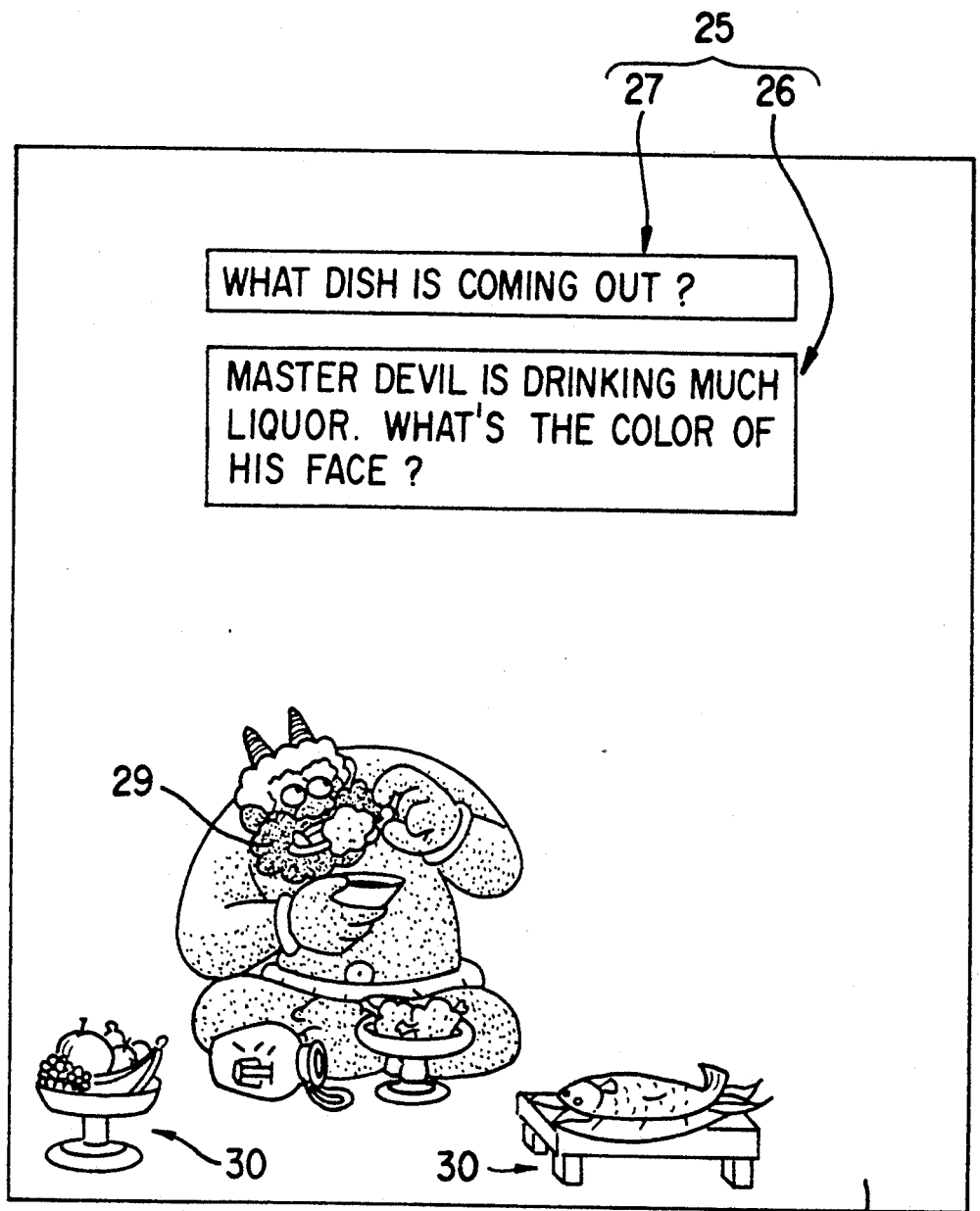
Figure 3A:
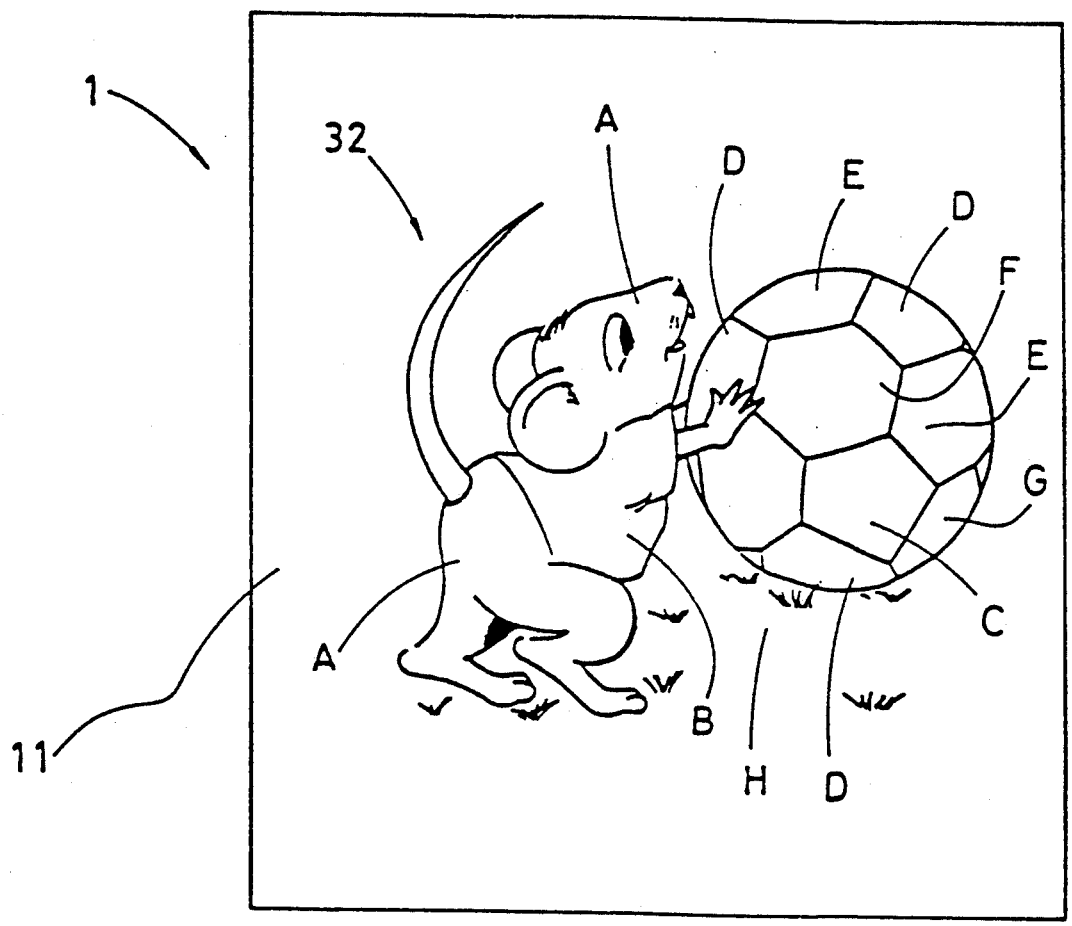

An embodiment of the present invention will now be describe by way of example, referring to the attached drawings, in which:

FIGS. 1(a) and (b) are front views showing one of the embodiments of the invention, FIGS. 2(a) to (c) are front views showing another embodiment, and FIGS. 3(a) and (b) are front views showing still another embodiment.

Figure 1B:
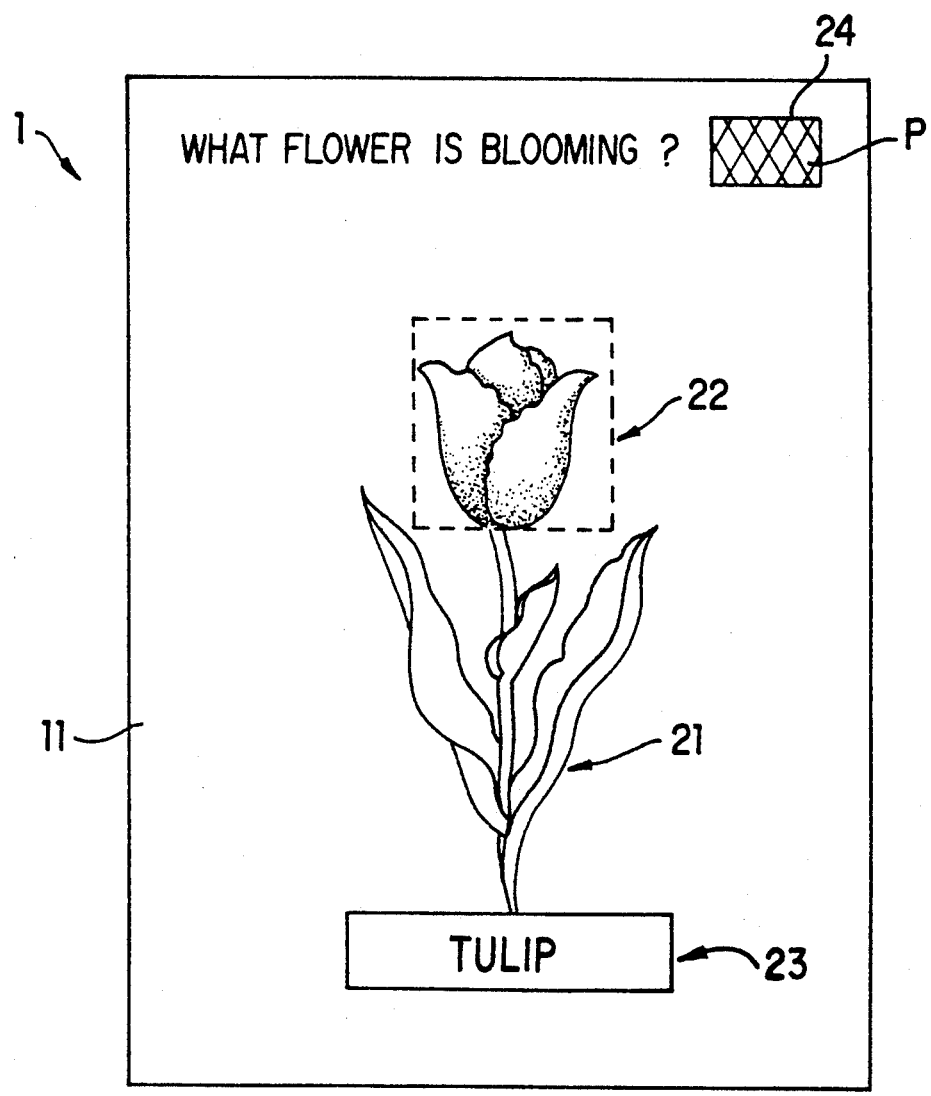

In FIGS. 1(a) and 1(b), a color changing print 1 of the invention is formed as an educational sheet 11 which shows a part of an object, allowing to learn considering its entire shape, name and colors of its major parts.

In FIG. 1(a), a stem and leaves 21 of a tulip are shown in visible colors, and above it is a color changing area Q framed by a visible dotted line 22, which is printed, by using a color changing material invisible when printed and a shape of a flower in purple, yellow or red, for example, is displayed by applying a color former on almost the entire color changing are Q. Below it is printed, in letters, the name of the flower, "TULIP", by using a color changing agent, which is framed with a visible line 23, and the letters become visible by applying a color former onto the color changing area Q. FIG. 1(b) shows the state after colors are developed by the color former.

Color changing agents and color formers used for the embodiment are described below.

Here a pH indicator agent having a colorless pH range can be used as a color changing agent. For such pH indicator agents, there are δ-dinitrophenol, m-nitrophenol, o-nitrophenol, p-nitrophenol, cyanine, α-naphthol phthalein, phenol phthalein, cresol phthalein, thymol phthalein, ethyl bis-acetic acid, bromphenol purple, hexamethoxy acid, heptamethoxy acid and so forth, which can be used according to the colors to be displayed. Mixed agents of plural types can be used as well as a monocomponent agent.

For color formers there are acid, alkaline or neutral combinations or their solutions, which can control pH value and have alkaline pH values between pH 7 and 14, such as ammonia, monoethanol amine, ethyl amines, propyl amines, 2-ethyl-hexyloxypropyl amine, 3-ethoxipropyl amine, diisobutyl amine, secbutyl amine, isopropanol amine, ethanol amines, 2-ethylhexyl amine and ethylene amines. There are also acetic acid and formic acid as examples of color formers having acid pH value between pH 1 and 7.

In this invention, in order to obtain clear color changing and to prevent discoloring, it is preferable to use water-solute polyhydric alcohol of about 5 to 50 weight percent in concentration, such as ethylene glycol, propylene glycol, polyethylene glycol and glycerol, together with color changing agent or color former.

The material of color former and its concentration are determined by the pH value at which the color changing agent develops a color. As for color formers which develop colors in a pH range close to neutrality, such as nitrophenols, pH values of color reactor ink vehicles are priorly arranged to be low by nonvolatile pH regulator such as diluted sulfuric acid and tartaric acid. This helps to prevent colors from changing after printing.

A color changing agent is prepared as an ink and generally controlled to be in colorless state. It is also possible to prepare to become colorless by drying after printing.

In order to prepare a color changing as a color changing ink, a solvent for a color changing agent, such as alcohols, is used, to which are added polyhydric alcohol, surface active agent and different resins. When developing colors by using color former such as water and alcohol after printing, it is preferably to utilize water-soluble color changing ink vehicle as a color changing ink. As additives to make water-soluble color changing ink vehicles, dimethyl sulfonamide, dimethyl sulfoxide, alcohols and polyhydric alcohols are used, and as viscosity intersifying agent, resin, shellac, guaiac gum, methyl cellulose and ethyl celluloses are used.

By either mixing and kneading color changing agents ground into fine grains with different types of ink vehicles or by mixing and kneading color changing agents after being dissolved in solutions and adhered to proper inorganic or organic powder with different types of ink vehicles, color developing inks can be arranged.

In printing, overlay printing is also possible using plural types of color changing inks.

In Table 1, combination examples of color changing agents and color formers which can be used for prints of this invention, pH values at which the color changing agents develop colors, i.e. color developing pH, pH values at which they discolor, i.e. discoloring pH, and kinds of colors are shown. The color developing pH is a value at which a printed portion turns the color density to become easily identifiable or legible to human eyes. The discoloring pH is a value at which it becomes in a discolored state so that it can be rarely sensed by normal naked eyes, and color changing and discoloring ranges can be selected at will between the two values. The time required to turn from discolored to colored state can be controled by such as quantity of pH regulator in color changing ink, 75 parts of denatured alcohol, 15 parts of water, 10 parts of surface active agent and 0 to 10 parts of tartaric acid can be contained as its vehicle composition.

As for applicators used to make color formers act on such prints, there are pen type applicators such as marker pens having acrylic or polyethylene tip on the leading ends as well as so-called felt-tip pens. A container having a spongy applicator part at the leading end, a sprayer and a container containing a color former with a brush, gum or a sponge roller used to apply the agent can also form an applicator of the invention.

Thus, in FIG. 1(a), the insides of the visible frame lines 22 and 23 of the educational sheet 11 are printed by using color changing agents and color changing inks with the pH values controlled to be within the colorless pH ranges of the color changing agents.

Therefore, the insides framed with the visible frame line 22 and 23 are invisible when printed, and readers consider the specific shape of the flower, its color and the name from the stem and the leaves 21 which are visible in the educational sheet 11. Then, by applying color former inside the frames using a writing material, the color changing agents develop colors, as shown in FIG. 1(b), and display a flower of a tulip inside the visible frame line 22 in purple, for example. At the same time, inside the visible frame line 23, letters "TULIP" are generated in a visible different from the color generated inside the visible frame line 22, in black, for example, and readers can simultaneously identify the shape of the flower, its color and the name. Thus, since the application of color formers is operated by readers' own hands, knowledge can be acquired effectively, and education is prevented from being monotonous.

Inside the visible frame line 22, it is possible to generate a color such as yellow or red, by selecting a proper color changing agent.

Moreover, as shown in FIGS. 1(a) and (b), it is also possible to adhere a sticker 24 on which a concentrated color former P is dried and adhered in a shape of a sheet, and by using a paint brush type applicator having a brush part containing city water, the color former P can be dissolved and applied onto the color reacting part to develop a visible color.

For the color former P, a weak alkaline material such as sodium carbonate can be preferably adopted, since it is less dangerous.

FIGS. 2(a), 2(b) and 2(c) show another embodiment of the invention.

This embodiment comprises suggestion boxes 25 set in two steps, the first suggestion box 26 and the second suggestion box 27 on the sheet, in which are printed visible letters meaning to suggest to apply color formers in some of the color changing areas, and is formed to allow a systematic and step-by-step education.

As a reader applies a color former to the face, following the visible letters in the suggestion box 26, as shown in FIG. 2(b), the color former reacts to a color changing agent previously printed on the face part 29, and changes to red, thus making the reader recognize the state under influence of liquor. By operating according to the second suggestion box 27, as shown in FIG. 2(c), dishes 30 are displayed. Such a color changing of the face part 29 and an appearance of the dishes 30 further increase the reader's interests. Upon the expression of the dishes 30, by printing with plural types of color changing agents, colorful pictures can be displayed, which further enriches effects of the education.

Moreover, such educational sheets 11 may be composed as a story-telling picture book by continually joining a plurality of sheets, and this invention may be effectively utilized in the education of infants.

Figure 3B:
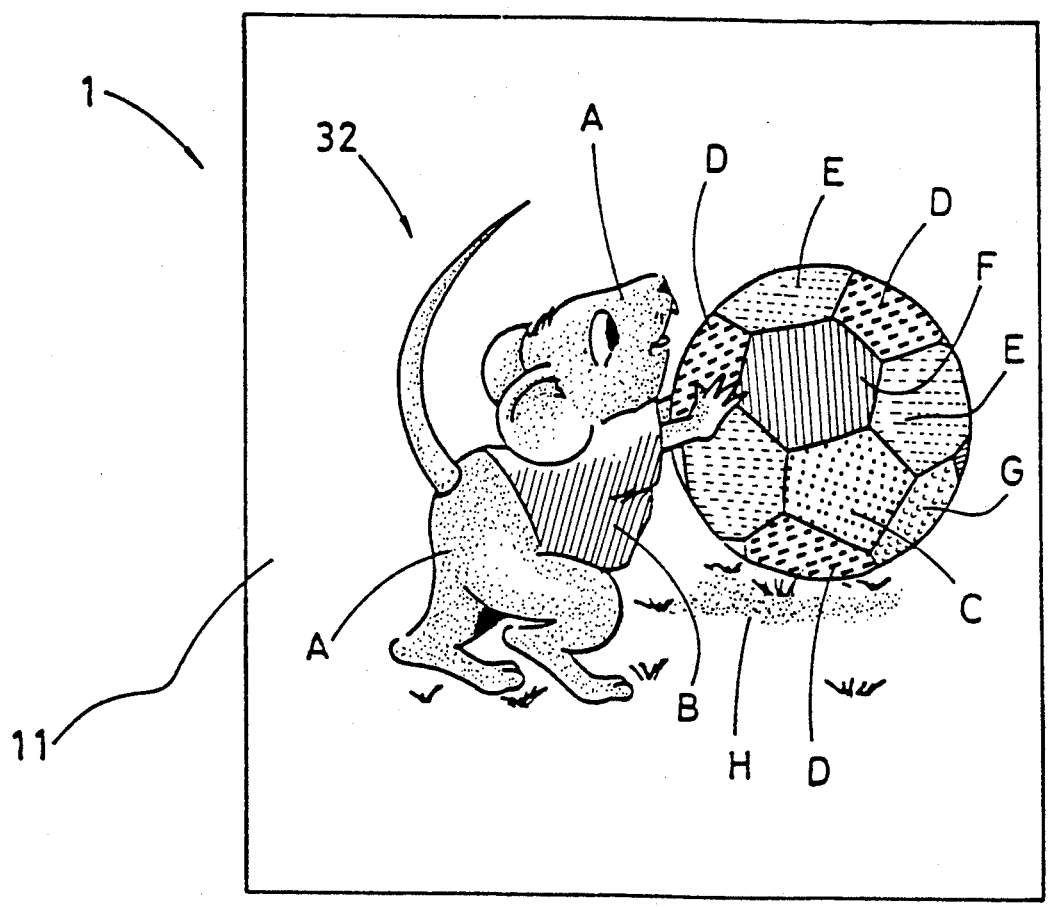

Furthermore, the invention can be formed, as shown in FIGS. 3(a) and 3(b), in an original picture book. In FIG. 3(a), outlines of a line drawing 32 are drawn by using a visible printing ink, and each of parts A, B, C, D, E, F, G and H are printed invisibly upon printing by using different color changing agents.

By applying color formers onto the line drawing 32 with an applicator, each color changing agent reacts to the color former, developing a specific color, and a colorful finished picture 33 (see FIG. 3(b)) is completed.

In this embodiment, due to a lot of colors developed by the reaction to the color formers, the finished picture 33 is better in the outlook, colors do not run out the lines unlike the conventional line drawings for coloring with color pencils or crayons, and since it is east to operate, it can be preferably adopted for child education and entertainment.

Thus, this invention can be embodied into a variety of shapes.

As described herein above, since a print of this invention comprises plural color changing areas printed by using inks containing color changing agents which changes from invisible colorlessness to corresponding visible colors by reaction with color formers, and education on detailed shapes and colors becomes possible, and since it allows a step-by-step and time-differential education, educational effects improve. In addition, since even a child can easily develop colors, it can be preferably adopted for such sheets that target children.

TABLE 1

| Color changing agent | Content/100 g | Color developing pH | Color fading pH | Color | Color former combined |
|---|---|---|---|---|---|
| γ-Dinitrophenol | 3 g | 5.8 | 4.0 | Yellow | Amines (liquid) |
| p-Nitrophenol | 3 g | 7.6 | 5.6 | Yellow | Amines (liquid), amine vapor, ammonia (liquid, vapor) |
| m-Nitrophenol | 3 g | 8.4 | 5.5 | Yellow | Amines (liquid, vapor) ammonia (liquid, vapor) |
| Cyanine | 4 g | 8.6 | 4.0 | Blue | Amines (liquid, vapor) |
| α-Naphthol phthalein | 2 g | 9.2 | 5.8 | Blue | Amines (liquid, vapor) ammonia (liquid, vapor) |
| Ethyl bis-acetic acid | 7 g | 10.5 | 7.5 | Blue | Amines (liquid) ammonia (liquid) NaOH KOH |
| Phenol phthalein | 7 g | 10.2 | 7.5 | Reddish purple | Amines (liquid) ammonia (liquid) NaOH KOH |
| Cresol phthalein | 5 g | 10.5 | 7.4 | Scarlet | Amines (liquid) ammonia (liquid) NaOH KOH |
| Thymol phthalein | 6 g | 11.6 | 8.6 | Blue | ammonia (liquid) NaOH KOH |
| Bromphenol purple | 5 g | 12.2 | 7.5 | purple | ammonia (liquid) NaOH KOH |
| Hexamethoxy red | 2 g | 2.6 | 5.0 | Reddish purple | Nitric acid |
| Heptomethoxy red | 2 g | 4.7 | 7.5 | Red | Acetic acid |

I claim:

1. A color changing print comprising plural color changing areas printed on a sheet of paper using inks each of which contains a color changing agent to change from substantially invisible colorlessness to a visible corresponding color through contact with a liquefied color former applied with an applicator, said applicator having a solvent for dissolving the color former, wherein said sheet of paper having a sheet of sticker adhering to a non-printed portion of said paper, said sticker being provided with a solidified color former, and wherein said liquefied color former is formed by dissolving said solidified color former of the sticker by application of said solvent of the applicator to the solidified color former.

2. A color changing print according to claim 1, wherein a visible frame is printed for framing the color changing areas on the sheet of paper.

3. A color changing print according to claim 1, wherein visible letters are previously printed on some of the color changing areas of the sheet of paper to suggest application of the color formers.

4. A color changing print according to claim 1, wherein the color formers are preliminarily deposited on the sheet of paper in a form of a concentrated piece of sheet, and the applicator comprises a brush part to apply the color formers using a liquid.

5. A color changing print according to claim 1, wherein the color former is a pH regulator and is one of the following materials: ammonia, monoethanol amine, ethyl amines, propyl amines, 2-ethyl-hexyl-oxypropyl amine, 3-ethoxipropyl amine, diisobutyl amine, sec-butyl amine, isopropanol amine, ethanol amines, 2-ethylhexyl amine, ethylene amines, acetic acid and formic acid.

6. A color changing print according to claim 1, wherein the inks comprise color changing agents, polyhydric alcohol and surface active agent mixed in a solvent.

7. A color changing print according to claim 1, and wherein the color changing agent is a pH indicator, and is a monocomponent agent or a mixed agent comprises one or plural of γ-dinitrophenol, m-nitrophenol, o-nitrophenol, p-nitrophenol, cyanine, α-naphthol phthalein, phenol phthalein, cresol phtalein, thymol phtalein, ethyl bis-acetic acid, bromphenol purple, hexamethoxy acid and heptamethoxy acid.

8. A color changing print according to claim 1, wherein said solvent is water.

* * * * *